United States Patent
Shimizu et al.

(10) Patent No.: US 8,425,054 B2
(45) Date of Patent: *Apr. 23, 2013

(54) PROJECTION TYPE IMAGE DISPLAY APPARATUS

(75) Inventors: Takuya Shimizu, Yokohama (JP); Kentaro Kato, Toyonaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,588

(22) Filed: Jan. 30, 2012

(65) Prior Publication Data

US 2012/0127438 A1    May 24, 2012

Related U.S. Application Data

(63) Continuation of application No. 13/209,153, filed on Aug. 12, 2011, now Pat. No. 8,142,025, which is a continuation of application No. 12/813,994, filed on Jun. 11, 2010, now Pat. No. 8,020,998, which is a continuation of application No. 11/500,969, filed on Aug. 9, 2006, now Pat. No. 7,753,535.

(30) Foreign Application Priority Data

Aug. 9, 2005    (JP) ................................. 2005-230230

(51) Int. Cl.
*G03B 21/14* (2006.01)
*F21S 8/00* (2006.01)

(52) U.S. Cl.
USPC .............................. 353/97; 353/38; 362/268

(58) Field of Classification Search .................... 353/38, 353/88, 89, 90, 91, 92, 93, 97; 362/286
See application file for complete search history.

(56) References Cited

U.S. PATENT DOCUMENTS 6,466,375 B1    10/2002    Kanaya
6,467,911 B1    10/2002    Ueyama et al.

(Continued)

FOREIGN PATENT DOCUMENTS

JP    5-303085 A    11/1993
JP    6-153214 A    5/1994

(Continued)

OTHER PUBLICATIONS

Entire Prosecution of U.S. Appl. No. 13/209,153 to Shimizu, et al., filed on Aug. 12, 2011, entitled "Projection Type Image Display Apparatus."

(Continued)

*Primary Examiner* — Francis M Legasse, Jr.
*Assistant Examiner* — Bao-Luan Le
(74) *Attorney, Agent, or Firm* — McDermott Will & Emery LLP

(57) ABSTRACT

According to the present invention, a projection type image display apparatus enables control of a large amount of light masking through a light-masking unit while maintaining a uniform illumination distribution in an area to be illuminated by the illumination light. The apparatus uses two array lenses on which lens cells are arranged in matrix form, where light-masking unit masks the array lens installed on the light source side in their particular area. The light-masking unit adjusts the amount of light emitted from the light source. The light-masking area of lens cells adjacent to lens cells closest to an optical axis is made smaller than the light-masking area of other cells.

32 Claims, 8 Drawing Sheets

U.S. PATENT DOCUMENTS

| | | |
|---|---|---|
| 6,559,901 B2 | 5/2003 | Yamamoto et al. |
| 6,578,987 B1 | 6/2003 | Hough et al. |
| 6,592,227 B2 | 7/2003 | Ouchi et al. |
| 6,631,997 B2 | 10/2003 | Miyata et al. |
| 6,683,657 B1 | 1/2004 | Miyawaki |
| 6,755,538 B2 | 6/2004 | Sugawara |
| 6,769,777 B1 * | 8/2004 | Dubin et al. ............... 353/97 |
| 6,796,657 B2 | 9/2004 | Shinoda et al. |
| 6,796,682 B2 | 9/2004 | Hough et al. |
| 6,854,851 B2 | 2/2005 | Yamasaki et al. |
| 7,055,965 B2 | 6/2006 | Koba |
| 7,055,966 B2 | 6/2006 | Momose et al. |
| 7,182,470 B2 | 2/2007 | Hashimoto et al. |
| 7,185,984 B2 | 3/2007 | Akiyama |
| 7,185,990 B2 | 3/2007 | Koga et al. |
| 7,207,679 B2 | 4/2007 | Totani et al. |
| 7,210,795 B2 | 5/2007 | Hara et al |
| 7,213,927 B2 | 5/2007 | Akiyama |
| 7,338,174 B2 | 3/2008 | Koba et al. |
| 7,344,255 B2 | 3/2008 | Hara et al. |
| 7,518,802 B2 | 4/2009 | Kojima |
| 2001/0015775 A1 | 8/2001 | Yamamoto et al. |
| 2002/0021292 A1 | 2/2002 | Sakashita |
| 2003/0086253 A1 | 5/2003 | Koyama et al. |
| 2003/0086265 A1 | 5/2003 | Ilsaka et al. |
| 2004/0080722 A1 * | 4/2004 | Yamasaki et al. ............ 353/97 |
| 2004/0125246 A1 | 7/2004 | Okamori et al. |
| 2004/0125274 A1 | 7/2004 | Asakura |
| 2004/0263801 A1 | 12/2004 | Totani et al. |
| 2005/0052346 A1 | 3/2005 | Koyama |
| 2005/0068505 A1 * | 3/2005 | Momose et al. ............ 353/97 |
| 2005/0094291 A1 | 5/2005 | Onishi et al. |
| 2005/0122481 A1 | 6/2005 | Yamasaki et al. |
| 2005/0185151 A1 | 8/2005 | Koba et al. |
| 2005/0195374 A1 | 9/2005 | Akiyama |
| 2005/0219474 A1 | 10/2005 | Hara et al. |
| 2005/0264770 A1 | 12/2005 | Hara et al. |
| 2006/0038966 A1 | 2/2006 | Long et al. |
| 2006/0050248 A1 | 3/2006 | Koga et al. |
| 2006/0050249 A1 | 3/2006 | Hashimoto et al. |
| 2006/0203210 A1 | 9/2006 | Shirasu et al. |

FOREIGN PATENT DOCUMENTS

| | | |
|---|---|---|
| JP | 7-175016 A | 7/1995 |
| JP | 10-339852 A | 12/1998 |
| JP | 2001-174910 A | 6/2001 |
| JP | 2001-222002 A | 8/2001 |
| JP | 2001-264727 A | 9/2001 |
| JP | 2002 090705 A | 3/2002 |
| JP | 2002-156703 A | 5/2002 |
| JP | 2002-196302 A | 7/2002 |
| JP | 2002-303931 A | 10/2002 |
| JP | 2002-365607 A | 12/2002 |
| JP | 2003-029203 A | 1/2003 |
| JP | 2003-107422 A | 4/2003 |
| JP | 2003-131322 A | 5/2003 |
| JP | 2003-149741 A | 5/2003 |
| JP | 2003-162002 A | 6/2003 |
| JP | 2003-167295 A | 6/2003 |
| JP | 2003-207850 A | 7/2003 |
| JP | 2003-241311 A | 8/2003 |
| JP | 2004 069966 A | 3/2004 |
| JP | 2004 226869 A | 8/2004 |
| JP | 2004-354938 A | 12/2004 |
| JP | 2004-361500 | 12/2004 |
| JP | 2005-017500 | 1/2005 |
| JP | 2005-017810 A | 1/2005 |
| JP | 2005-031103 | 2/2005 |
| JP | 2005-062849 A | 3/2005 |

OTHER PUBLICATIONS

Entire Prosecution of U.S. Appl. No. 12/813,994 to Shimizu, et al., filed on Jun. 11, 2010, entitled "Projection Type Image Display Apparatus."

Entire Prosecution of U.S. Appl. No. 11/500,969 to Shimizu, et al., filed on Aug. 9, 2006, entitled "Projection Type Image Display Apparatus."

* cited by examiner

| 0.0% | 0.1% | 0.2% | 0.3% | 0.3% | 0.2% | 0.1% | 0.0% |
|---|---|---|---|---|---|---|---|
| 0.0% | 0.2% | 0.4% | 0.6% | 0.6% | 0.4% | 0.2% | 0.0% |
| 0.1% | 0.4% | 0.7% | 1.0% | 1.0% | 0.7% | 0.4% | 0.1% |
| 0.2% | 0.6% | 1.4% | 1.8% | 1.8% | 1.4% | 0.6% | 0.2% |
| 0.3% | 1.0% | 1.8% | 2.4% | 2.4% | 1.8% | 1.0% | 0.3% |
| 0.4% | 1.2% | 2.1% | 2.5% | 2.5% | 2.1% | 1.2% | 0.4% |
| 0.5% | 1.2% | 1.9% | 1.5% | 1.5% | 1.9% | 1.2% | 0.5% |
| 0.5% | 1.2% | 1.9% | 1.5% | 1.5% | 1.9% | 1.2% | 0.5% |
| 0.4% | 1.2% | 2.1% | 2.5% | 2.5% | 2.1% | 1.2% | 0.4% |
| 0.3% | 1.0% | 1.8% | 2.4% | 2.4% | 1.8% | 1.0% | 0.3% |
| 0.2% | 0.6% | 1.4% | 1.8% | 1.8% | 1.4% | 0.6% | 0.2% |
| 0.1% | 0.4% | 0.7% | 1.0% | 1.0% | 0.7% | 0.4% | 0.1% |
| 0.0% | 0.2% | 0.4% | 0.6% | 0.6% | 0.4% | 0.2% | 0.0% |
| 0.0% | 0.1% | 0.2% | 0.3% | 0.3% | 0.2% | 0.1% | 0.0% |

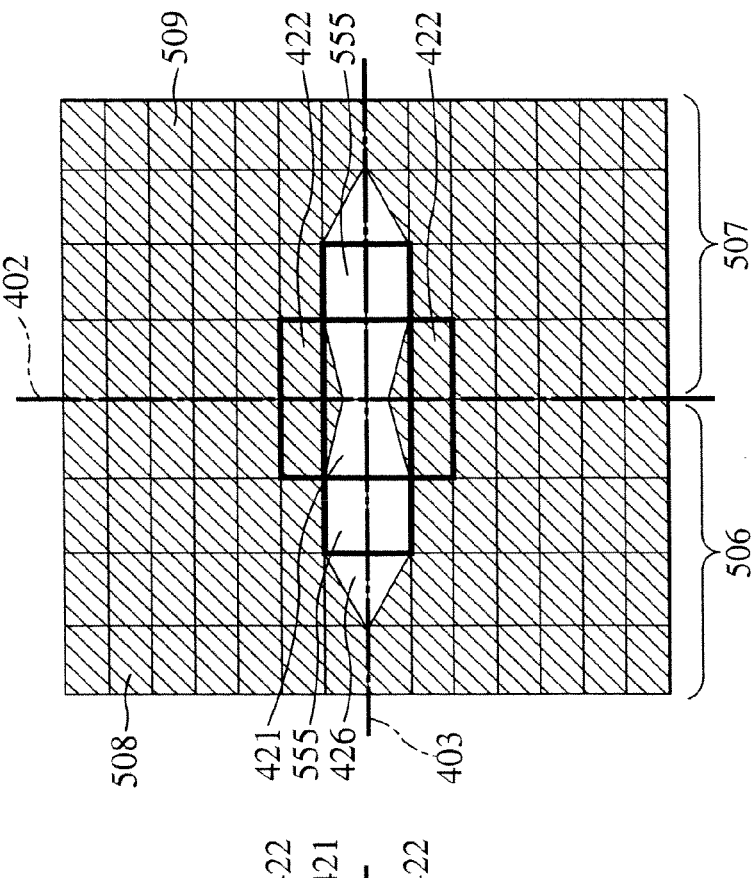

PROJECTION TYPE IMAGE DISPLAY APPARATUS

RELATED APPLICATIONS

The present application is a Continuation of U.S. application Ser. No. 13/209,153, filed on Aug. 12, 2011 now U.S. Pat. No. 8,142,025, which is a Continuation of U.S. application Ser. No. 12/813,994, filed on Jun. 11, 2010, now U.S. Pat. No. 8,020,998, which is a Continuation of U.S. patent application Ser. No. 11/500,969, filed on Aug. 9, 2006, now U.S. Pat. No. 7,753,535, which claims priority from Japanese application serial no. JP 2005-230230, filed on Aug. 9, 2005, the entire contents of each of which are hereby incorporated by reference.

BACKGROUND OF THE INVENTION

The present invention relates to a projection type image display apparatus which forms an optical image based on a picture signal by means of an image display element and projects the optical image on a screen or the like.

With a conventional projector optical system, when optical modulation of the image display element is performed in order to minimize the luminance, a phenomenon called "grayish black" occurs with which the light absorbed by a light-exiting polarization plate is not sufficient and the screen luminance does not decrease. The light-exiting polarization plate aligns the polarization of light beams modulated by the image display element.

For this reason, there is a means for improving the contrast by reducing the minimum luminance of a projection type image display apparatus through light control means for changing the light volume of the entire screen based on external signals, other than a light valve. External signals in this case include a picture signal, an external environment measurement signal, a signal intentionally manipulated by user, etc. As one example of the above means, techniques using a light-masking unit for changing the amount of masking light according to an image signal in an illumination optical system are disclosed in U.S. Patent Application Publication No. US 2003/0086265A1, Japanese Patent Laid-open No. 2005-17500 and Japanese Patent Laid-open No. 2005-31103.

SUMMARY OF THE INVENTION

To widen the dynamic range of a projection type image display apparatus, it is necessary to increase the amount of light masking by a light-masking unit arranged in an illumination optical system. To increase the amount of light masking by the light-masking unit, it is necessary to increase the light-masking section with which light-masking plates included in the light-masking unit mask light beams.

However, there has been a problem that, with the increase in the amount of light masking, the illumination distribution in an area to be illuminated by illumination light is likely to become nonuniform because of a decrease in the number of second light source images superimposed on an area to be illuminated by an illumination optical system formed by array lenses. There has been another problem that, when the light-masking unit turns or moves a light mask to perform light masking, the variation of the illumination distribution when the light mask is moved or turned is likely to be reflected on a screen.

In particular, the image display element, like a liquid crystal display element, has such a characteristic that degrades more the contrast performance with increasing angle of the incident light with respect to the normal line of the element surface. The above-mentioned problems stand out, if light masking is performed starting from pieces of light having a larger angle with respect to the normal line of an image display element, which adversely affects the contrast performance of the image display element, in order to improve the contrast performance of the projection type image display apparatus.

An object of the present invention is to enable control of a large amount of light masking through a light-masking unit while maintaining a uniform illumination distribution in an area to be illuminated by the illumination light.

Another object of the present invention is to provide a projection type display apparatus having a wide dynamic range, excellent power of image expression, and the ability to respond the environment and user's intention.

According to an aspect of the present invention, with a projection type image display apparatus which makes uniform the light of the light source using two array lenses on which lens cells are arranged in matrix form, light-masking unit masks the array lens installed on the light source side in their particular area. The light-masking unit adjusts the amount of light emitted from the light source. The light-masking area of lens cells adjacent to lens cells closest to an optical axis is made smaller than the light-masking area of other cells.

BRIEF DESCRIPTION OF THE DRAWINGS

FIG. 9 is a diagram showing another example of light-masking section of the array lens.

DETAILED DESCRIPTION OF PREFERRED EMBODIMENTS

Figure 1A:
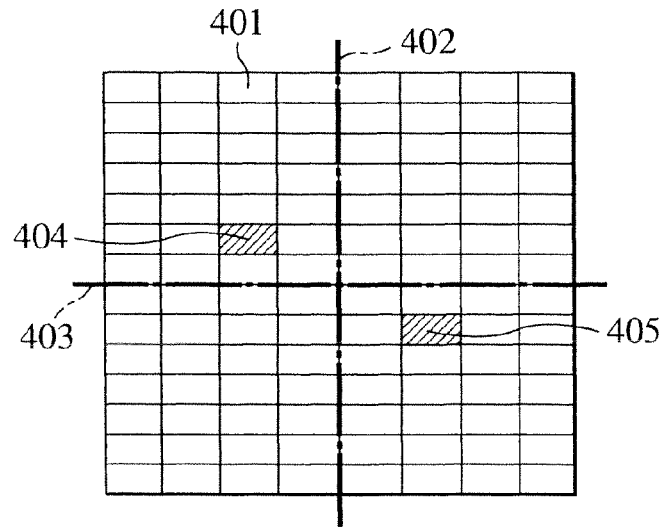
FIG. 1A is a diagram showing a configuration of an array lens on the light source side.
Figure 1B:
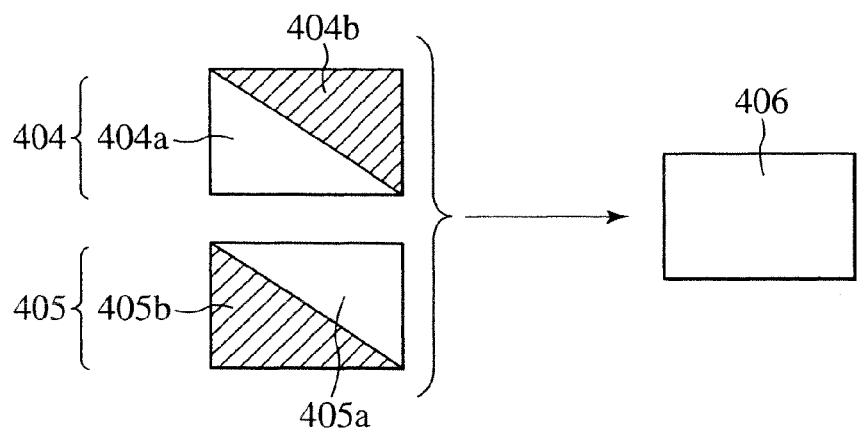
FIG. 1B is a diagram showing an example of superimposition of light-masked cells.

An embodiment of the present invention will be explained below with reference to the accompanying drawings. In each drawing, the same symbols are assigned to elements having a common function and duplicated explanations are omitted. For components which should be discriminated for each color's light path, subscript R, G, or B is supplied to a reference numeral. The subscript is omitted unless the omission causes inconvenience in explanation. Subscript a, b, c, or d supplied to a reference numeral indicates a component indicated by the reference numeral or the optical axis or optical direction regarding a component indicated by the reference numeral.

First, an embodiment of the present invention will be explained below with reference to FIG. 1 to FIG. 5.

A projection type image display apparatus in an embodiment of the present invention includes a light source, two array lenses sequentially arranged from the near side of the light source along the optical axis of the light emitted from the light source, a uniform illumination unit which makes uniform the illumination distribution of the light inputted from the light source, and a light control unit which adjusts the amount of light emitted from the light source. The uniform illumination unit includes a superimposing lens which superimposes on the illumination surface a plurality of second light source images formed by the two array lenses. The light control unit is installed on the optical axis of the light emitted from the light source. Furthermore, the amount of light emitted from the uniform illumination unit can be adjusted by controlling the light control unit based on information from external. Of the two array lenses, at least one installed on the light source side includes a plurality of substantially rectangular lenses in predetermined array arrangement. The light control unit is installed on the incidence side of two array lenses, between the two array lenses, between the two array lenses and the superimposition lens, or on the light-exiting side of the superimposition lens. The light control unit is a light-masking unit which adjusts the light volume of the illumination light. In operation, the light control unit masks illumination light beams inside the uniform illumination unit or before and after the uniform illumination unit by moving or turning one or more light-masking plates in a predetermined direction. When the light-masking unit adjusts the amount of light emitted from the light source to the minimum level, the shape of the light-masking plates is such that the area of a predetermined cell is smaller than the area of other cells when the light-masking plates are projected on each cell of the array lens on the light source side.

An object of light masking only for a predetermined area of a predetermined cell is to keep more uniform the illumination distribution in the area to be illuminated by the illumination light while increasing the amount of light masking by the light-masking unit. Light masking only for a predetermined area of a predetermined cell is specifically explained below.

An integrator optical system using an array lens obtains more uniform illumination distribution generally by superimposing second light source images of the illumination distribution of each cell on the area to be illuminated. The rate of contribution to the illumination intensity for superimposed illumination distribution depends on each array lens cell. When the light-masking plates partially mask light beams which penetrate through each cell, the illumination distribution of each cell becomes nonuniform because of nonuniform light masking by the light-masking plates. Therefore, since the illumination distribution of cells having the highest rate of contribution to the illumination intensity has a large effect on the illumination distribution superimposed on an image display element, the illumination distribution superimposed on the image display element becomes most nonuniform when this cell is partially light-masked. As increasing number of cells are light-masked by the light-masking plates and accordingly decreasing number of cells are not subject to masking of light beams, the illumination distribution of cells having a high rate of contribution to the illumination intensity has a larger effect on the illumination distribution superimposed on the image display element, thereby increasing the ununiformity of the illumination distribution superimposed on the image display element when this cell is partially light-masked.

When the light-masking unit thus adjusts the amount of light emitted from the light source toward the decreasing direction, light masking is performed so that the area of the light-masking section at cells having a high rate of contribution to the illumination intensity is smaller than the area of the light-masking section at other cells. This configuration makes it possible to obtain larger amount of light masking while maintaining more uniform illumination distribution superimposed on the image display element.

In the process where the light-masking unit adjusts the light volume toward the minimum level, if light beams of many cells remain not light-masked, even light beams penetrating through cells having the highest rate of contribution to the illumination intensity have a comparatively small effect on the ununiformity of the illumination distribution. In this condition, there is a small effect on the ununiformity of the illumination distribution superimposed on the image display element even if cells having a high rate of contribution to the illumination intensity are partially or entirely light-masked. However, after cells having a high rate of contribution to the illumination intensity are entirely light-masked, the ununiformity of the illumination distribution is most affected when cells without entire masking of light beams, having the highest rate of contribution to the illumination intensity, are partially light-masked. Therefore, when the light-masking unit adjusts the amount of light emitted from the light source to the minimum level, light-masking control is performed so that the area of the light-masking section at cells other than ones with entire masking of light beams or ones with partial transmission of light beams, having the highest rate of contribution to the illumination intensity, is smaller than the area of the light-masking section at other cells. This configuration makes it possible to obtain larger amount of light masking while maintaining more uniform illumination distribution superimposed on the image display element.

Furthermore, in order to increase the amount of light masking, when cells with partial transmission of light beams, having the highest rate of contribution to the illumination intensity, are partially light-masked, it is desirable that the area of the light-masking section at the cells be not more than one half of area of the cells. The reason is explained below with reference to FIG. 1.

In FIG. 1A, an array lens is viewed from the optical axis direction. On the array lens, rectangular cells are arranged in directions which are in parallel with two arbitrary axes perpendicularly intersecting in a plane of the array lens. Reference numeral 401 denotes an edge line of a cell; 402, one axis of the two axes; and 403, the other axis of the two axes. With the array lens configuration shown in FIG. 1A, there are paired cells which are arranged symmetrically to the optical axis, such as hatched cells 404 and 405 in FIG. 1A.

These cells 404 and 405 are paired cells. If the area of the light-masking section at paired cells is not more than one half of the area of each cell, the illumination distribution for one cell can be formed by overlapping light-transmitting sections of the paired cells by, for example, a light-masking method shown in FIG. 1B. With paired cells 404 and 405 in FIG. 1B, light-transmitting sections are 404a and 405a, and light-masking sections are 404b and 405b. If the area of light-masking sections 404b and 405b is not more than one half of the area of one cell, in other words, if the area of light-transmitting sections (opening sections) is not less than one half of the area of one cell, illumination distribution 406 after superimposition has no section with little illumination intensity, resulting in uniform illumination distribution.

Figure 1C:
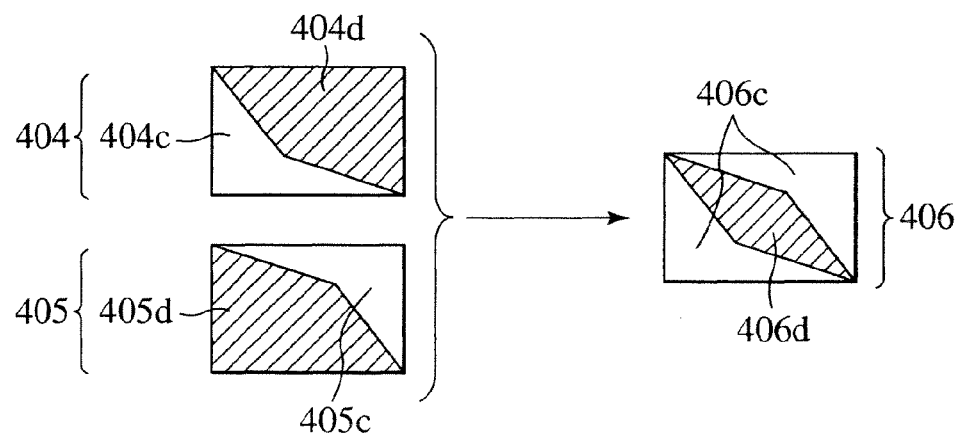
FIG. 1C is a diagram showing another example of superimposition of light-masked cells.

On the other hand, if the area of light-masking sections of paired cells is not less than one half of the area of each cell, in other words, if the area of light-transmitting sections (opening sections) is not more than one half of the area of each cell, illumination distribution for one cell cannot be formed even by overlapping light-transmitting sections of paired cells as shown in FIG. 1C. As a result, a portion with extremely low illumination intensity occurs. With paired cells 404 and 405 in FIG. 1C, light-transmitting sections are 404c and 405c, and light-masking sections are 404d and 405d. If the area of light-masking sections 404d and 405d is not less than one half of the area of one cell, illumination distribution 406 after superimposition has sections 406c with high illumination intensity and a section 406d with extremely low illumination intensity, resulting in remarkably nonuniform illumination distribution. With paired cells having a low rate of contribution to the illumination intensity, there is a small effect on the illumination distribution after superimposition of light beams of each cell. With paired cells having a high rate of contribution to the illumination intensity, however, there is a large effect on the illumination distribution, resulting in nonuniform illumination distribution on the image display element on which illumination distribution of all cells is superimposed. Therefore, it is desirable that the area of the light-masking section at cells having the highest rate of contribution to the illumination intensity or cells other than ones with entire masking of light beams, having the highest rate of contribution to the illumination intensity, be not more than one half of the area of the cell.

Generally, cells for an array lens are arranged in a plane which is perpendicular to the optical axis of the light source, symmetrically to the optical axis. Therefore, taking into account that the illumination distribution of each cell is superimposed on the image display element, it is desirable that the light-masking section by light masks included in the light-masking unit be realized symmetrically to the optical axis in order to prevent the deviation of the illumination distribution. With a configuration having an array lens shown in FIG. 1A, for example, it is desirable that light masking be performed particularly in line symmetry to the two axes, i.e., in point symmetry to the center of the array lens through which the optical axis penetrates in order to prevent the deviation of the illumination distribution.

Figure 2:
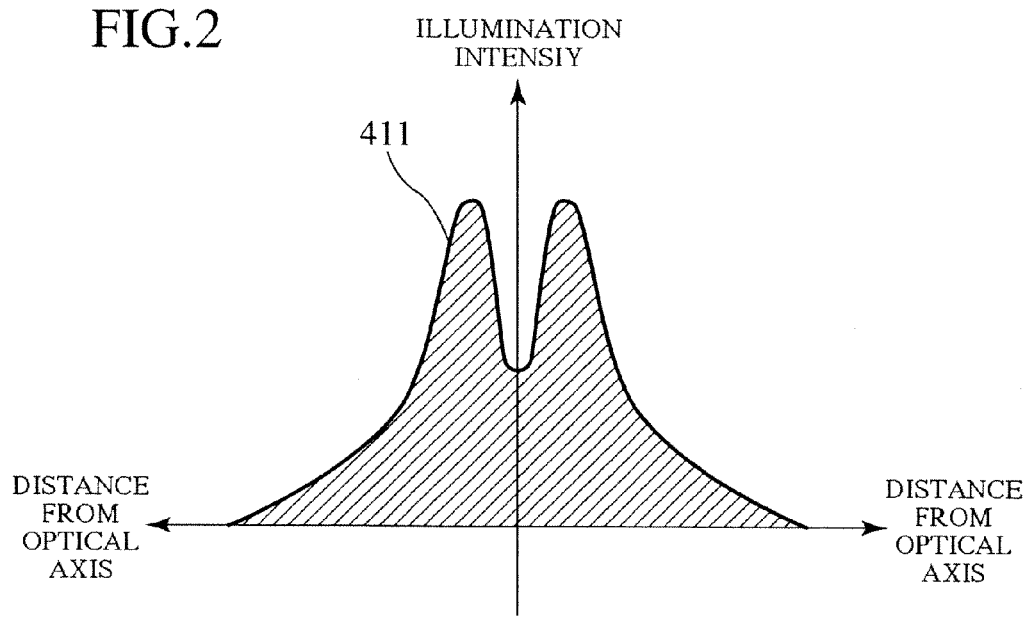
FIG. 2 is a graph showing the illumination intensity of penetrating light beams at the array lens surface on the light source side with respect to the distance along the direction from an optical axis, recognizing a point intersecting with the optical axis as origin.

FIG. 2 shows a graph with the vertical axis assigned the illumination intensity 411 of light beams at the array lens surface on the light source side and the horizontal axis assigned the distance along the direction from the optical axis to outside, recognizing a point intersecting with the optical axis as origin. As shown in FIG. 2, a peak of the illumination intensity exists not near the optical axis but at positions slightly apart from the optical axis. The reason is explained below with reference to FIG. 3.

Figure 3:
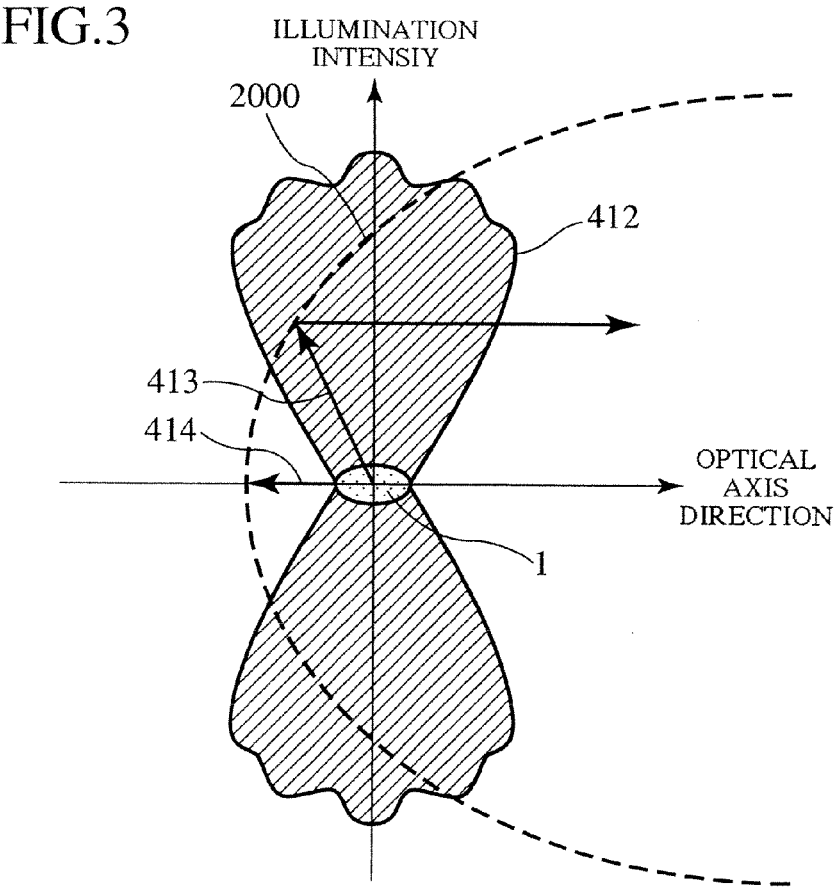
FIG. 3 is a diagram showing the distribution of outgoing light emitted from the light source.

FIG. 3 indicates a light source 1, a reflecting surface 2000 of a reflecting mirror, and distribution 412 of the light emitted from the light source. For convenience of explanation, the distribution 412 of the emitted light is represented on the premise that no reflection occurs on the reflecting surface 2000 of the reflecting mirror. As shown in FIG. 3, the amount of light emitted in the optical axis direction 414 is smaller than the amount of light 413 emitted in a direction at an angle with the optical axis direction. Therefore, when light beams having the illumination distribution reflect off the reflecting surface 2000 of the reflecting mirror and then advance in parallel with the optical axis direction, the illumination distribution as shown in FIG. 2 is obtained.

Figures 4, 5:
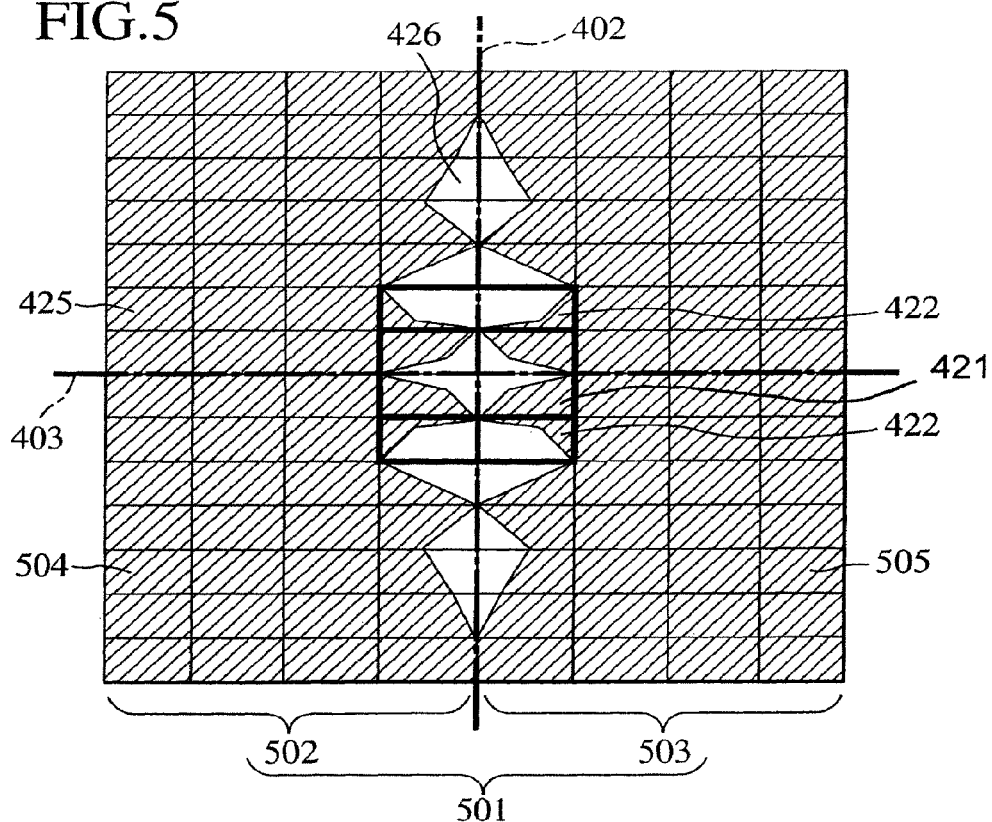
FIG. 4 is a diagram showing an example of rate of contribution to the illumination intensity of each cell of the array lens.
FIG. 5 is a diagram showing an example of arrangement and light-masking section of the array lens.

FIG. 4 indicates the rate of contribution to the illumination intensity when the amount of light emitted from the light source is adjusted to the maximum level. In FIG. 4, a numeral in each cell indicates the rate of contribution to the illumination intensity of the cell on the image display element 18 (in FIG. 6) when the amount of light emitted from the light source is adjusted to the maximum level. Cells having the highest rate of contribution to the illumination intensity are included in cell sections 422 adjacent to a cell section 421 at the center of the array lens 3 through which the optical axis penetrates. The calculation of the rate of contribution to the illumination intensity can be simulated using, for example, illumination optical system evaluation and design software "ODIS" from Yoshida Optical Laboratory of Japan or optical design and evaluation program "CODE V" from ORA (Optical Research Associates) of the U.S.A. The simulation procedure includes the evaluation of the total amount of light beams A for all cells used, light masking (setting the transmission factor to 0%) or narrowing down of the aperture except for one cell, and measurement of the amount of light beams B for that one cell. The rate of contribution to the illumination intensity is represented by B/A×100. This process is performed for each cell of the array lens. Based on the illumination distribution characteristic shown in FIG. 3, cells having the highest rate of contribution to the illumination intensity in FIG. 4 are ones included in the cell sections 422 adjacent to the center cells but not ones included in the center cell section 421.

Therefore, by performing light masking so that the area of the light-masking section at cells adjacent to the center cells may be smaller than the area of the light-masking section at other cells, larger amount of light masking can be obtained while maintaining uniform illumination distribution superimposed on the image display element. Furthermore, the rate of contribution to the illumination intensity at the center cells is lower than that at cells adjacent to the center cells. Therefore, by controlling light masking so that the area of the light-masking section at center cells may be larger than the area of the light-masking section at cells adjacent to the center cells, larger amount of light masking can be obtained while maintaining uniform illumination distribution superimposed on the image display element.

The above-mentioned light-masking control is necessary particularly to perform light masking from the minimum amount of emitted light to about 20% of the maximum amount of emitted light. The reason is explained below.

Generally if the image display element, like a liquid crystal display element, has such a characteristic that degrades more the contrast performance with increasing angle with respect to the normal line of the element surface of the incident light, light masking is performed using a light-masking unit starting from pieces of light having a larger angle with respect to the normal line of an image display element which adversely affects the contrast performance. Eventually, when the light-masking unit is adjusted so that the amount of light emitted from the light source may be minimized, only some cells near the center transmit light beams. In an example shown in FIG. 4, the sum of the rate of contribution to the illumination intensity of the sections 422 formed by four cells adjacent to the center cells, in line symmetry to the two axes, accounts for approximately 9 to 10% of the total value. When the light-masking unit is adjusted so that the adjusted amount of emitted light may be not more than 20% of the maximum amount of emitted light, the sum of the rate of contribution to the illumination intensity of cells included in the sections 422 relatively becomes 40 to 50%. Therefore, when the sections 422 consisting of cells adjacent to the center cell section 421 are partially light-masked, there is a large effect on the ununiformity of the illumination intensity.

On the other hand, the rate of contribution to the illumination intensity of other cells becomes not more than that at cells included in the sections 422. Therefore, the effect on the ununiformity of the illumination intensity when cells other than ones adjacent to the center cells are partially light-masked is smaller than that when cells adjacent to the center cells are partially light-masked. In particular, the rate of contribution to the illumination intensity at the center cells is 4 to 5% of the total amount of emitted light with the example in FIG. 4. Therefore, even when the light-masking unit is adjusted so that the adjusted amount of emitted light may be not more than 20% of the maximum amount of emitted light, the rate of contribution to the illumination intensity at the center cells is relatively about 25%. Therefore, the effect on the ununiformity of the illumination intensity when the center cells are partially light-masked is smaller than that when cells adjacent to the center cells are partially light-masked.

Based on the above, it is effective that light masking is performed from the minimum amount of emitted light to about 20% of the maximum amount of emitted light and that the area of the light-masking section at cells other than ones with entire masking of light beams, having the highest rate of contribution to the illumination intensity, or cells adjacent to the center cells is smaller than the area of the light-masking section at other cells including the center cells.

When the light-masking unit adjusts the amount of light emitted from the light source to the minimum level, the effect by the light-masking unit can be made larger by making a condition that light beams penetrating through all cells are partially or entirely light-masked in each cell of the array lens on the light source side as shown in FIG. 5. FIG. 5 shows, from the light source side, a condition that light masks 502 and 503 of light-masking unit 501 is projected on a first array lens 3 (in FIG. 6). FIG. 5 shows a condition that the amount of light emitted from the light source is adjusted to the minimum level. A hatched section 425 is a light-masking section and a section 426 is a light-transmitting section. Of the light-masking section 425, section 504 is a section which is light-masked by a first light mask 502 and section 505 is a section which is light-masked by a second light mask 503.

In this case, cells having the highest rate of contribution to the illumination intensity, cells other than ones with entire masking of light beams, having the highest rate of contribution to the illumination intensity, or cells adjacent to the center cells are partially light-masked. Since the illumination distribution with partial light masking of these light beams has a large effect on the illumination distribution superimposed on the image display element, both the uniformity of the illumination distribution and the amount of light masking can be attained by making the area of the light-masking section at these cells smaller than the area of the light-masking section at other cells or center cells.

Referring to an example in FIG. 5, the light-masking section at cells having the highest rate of contribution to the illumination intensity, cells other than ones with entire masking of light beams, having the highest rate of contribution to the illumination intensity, or cells forming cell sections 422, adjacent to the center cell section or the cell section 421 contacting the optical axis is smaller than the area of the light-masking section at other cells. It should be noted that "adjacent to" means a cell and another adjacent to it share a side.

Therefore, when the amount of light masking is maximized, i.e., the amount of transmission light is minimized, a light-masking section formed by a first light mask 502 and a second light mask 503 has a section corresponding to each cell of the array lens 3 on the light source side. A cell and a corresponding section have such a positional relationship that they are specified by the same row and column when an image formed by projecting the light-masking surfaces projected on the light source array lens is split in matrix form in the same manner as cells. Furthermore, the area (opening area) of the light-transmitting section of a section corresponding to any one cell included in the sections 422 is lager than the area of the light-transmitting section of a section corresponding to any one cell including the section 421. For cells forming the cell sections 422, the area of the light-masking section is not more than one half of the area of these cells. Not limited to the sections 421 and 422, the area of the light-transmitting section in a section corresponding to each cell can be determined by the rate of contribution to the illumination intensity. Specifically, it is desirable that the area of the light-transmitting section be larger with higher rate of contribution to the illumination intensity. With the example in FIG. 4, therefore, since the rate of contribution to the illumination intensity decreases with increasing distance from the sections 422 to outside along the direction of an axis 402, it is preferred that the area of the light-transmitting section be also reduced in incremental steps.

Figure 6:
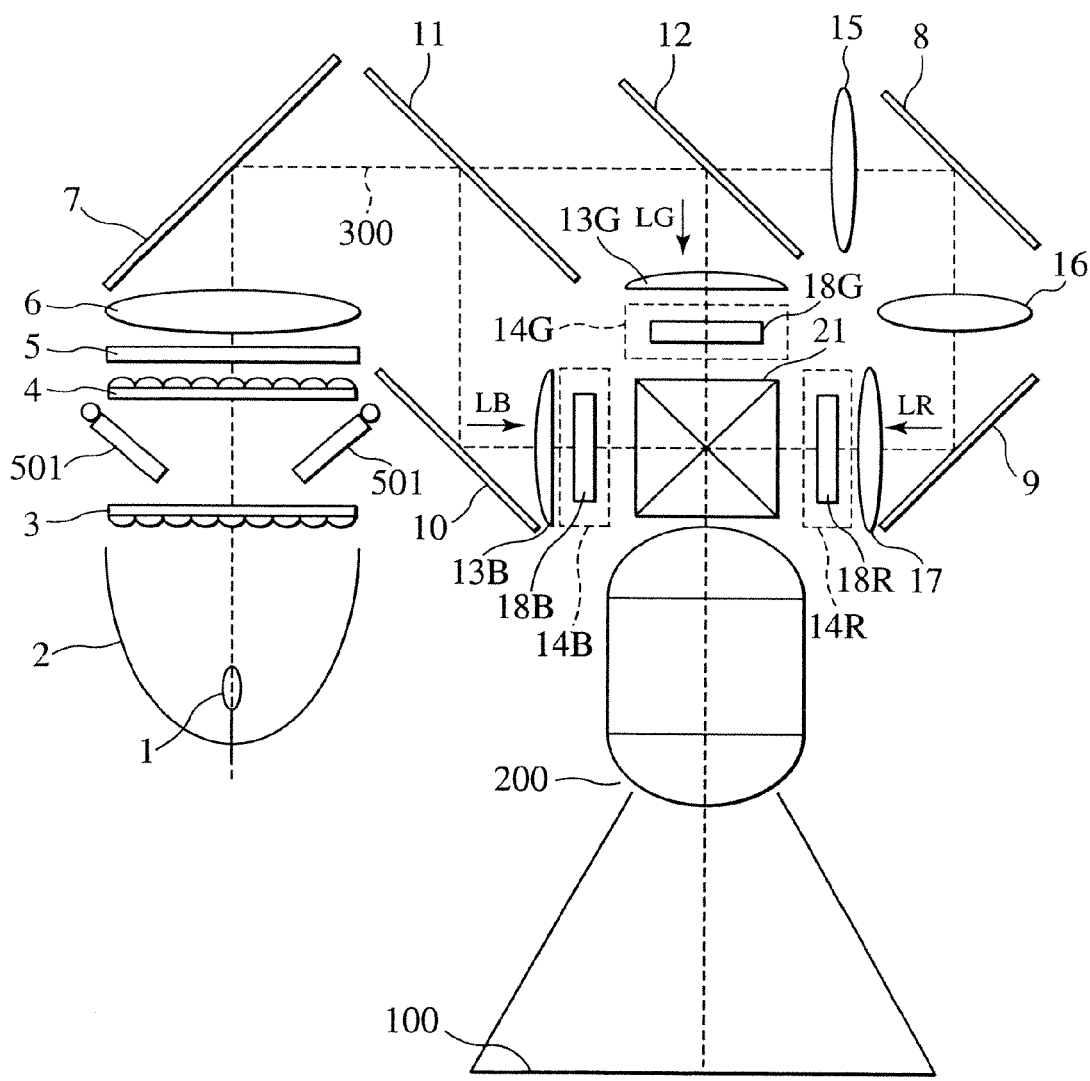
FIG. 6 is a diagram showing a configuration of an optical system.

A configuration of a projection type image display apparatus is explained below. FIG. 6 is a diagram showing a configuration of a projection type image display apparatus. With the 3-plate projection type image display apparatus in FIG. 6, reference numeral 1 denotes a light source which is a white lamp such as an extra-high pressure mercury lamp, metal-halide lamp, xenon lamp, mercury xenon lamp, or halogen lamp. The light source 1 is provided with at least one reflecting mirror 2 having a circular or polygonal light-exit opening. The light emitted from the light source 1 penetrates through light valves 14R, 14G, and 14B including an image display element, advances toward a projection lens 200, and is projected on a screen 100. The light radiated from the lamp of the light source 1 is reflected, for example, by the reflecting mirror 2 having a paraboloidal surface to become in parallel with the optical axis and then input into a first array lens 3.

A first array lens 3 splits the incoming light into a plurality of light beams with a plurality of lens cells arranged in matrix form and then guides them so that they efficiently pass through a second array lens 4 and a polarization conversion element 5. Specifically, the first array lens 3 is designed so that the light source 1 and each lens cell of the second array lens 4 form a relationship of object and image (conjugate). Like the first array lens 3, the second array lens 4 having a plurality of lens cells arranged in matrix form projects the shape of the lens cells of the first array lens 3 corresponding to each lens cell on an image display element 18 in the light valves 14. At this time, light beams from the second array lens 4 are aligned to a predetermined polarizing direction by the polarization conversion element 5.

Each projection image on each lens cell of the first array lens 3 advances through a superimposing lens 6, a condenser lens 13, a first relay lens 15, a second relay lens 16, and a third relay lens 17 and then is superimposed on the image display element 18 in the light valves 14. The superimposing lens 6 is provided with an optical axis 300.

Since the first array lens 3 and image display element 18 are designed such that they form a relationship of object and image (conjugate), a plurality of light beams split by the first array lens 3 are superimposed by the second array lens 4 and a nearby superimposing lens 6 and then projected on the image display element 18 in the light valves 14, enabling illumination with highly uniform illumination distribution having a practically problem-free level.

In this process, when the light reflected by a reflecting mirror 7 enters a dichroic mirror 11, for example, the B light (light in the blue color band) is reflected while the G light (light in the green color band) and R light (light in the red color band) are transmitted by the dichroic mirror 11, resulting in color separation into two different colors. Then, the G+R light is separated into the G light and R light by a dichroic mirror 12. For example, the G light is reflected while the R light is transmitted by the dichroic mirror 12. Various types of color separation methods are assumed; for example, the dichroic mirror 11 may reflect the R light and transmit the G light and B light, or it may reflect the G light and transmit the R light and B light.

With the configuration in FIG. 6, the B light reflects off the dichroic mirror 11 and then a reflecting mirror 10, passes through a condenser lens 13B and then a light valve 14B for the B light, and enters a light-composition prism 21. The B light which penetrates through the condenser lens 13B and enters the light valve 14B is referred to as LB. Of the G light and R light transmitted by the dichroic mirror 11, the G light reflects off a dichroic mirror 12, passes through a condenser lens 13G, enters and penetrates through a light valve 14G for the G light, and enters the light-composition prism 21. The G light which penetrates through the condenser lens 13G and enters the light valve 14G is referred to as LG. The R light penetrates through the dichroic mirror 12, condensed by the first relay lens 15, reflects off a reflecting mirror 8, further condensed by the second relay lens 16, reflects off a reflecting mirror 9, further condensed by the third relay lens 17, and enters a light valve 14R for the R light. The R light penetrates through the light valve 14R and then enters a light-composition prism 21. The R light which penetrates through the relay lens 17 and enters the light valve 14R is referred to as LR.

The B light, G light, and R light which penetrated through respective image display element 18 are combined by the light-composition prism 21 to form a color image. This image passes through the projection lens 200, such as a zoom lens, and then reaches the screen 100. An optical image formed on the image display element 18 in the light valves 14 after light-intensity modulation according to an image signal (not shown) is projected on the screen 100 in magnified form through the projection lens 200.

Figure 7A:
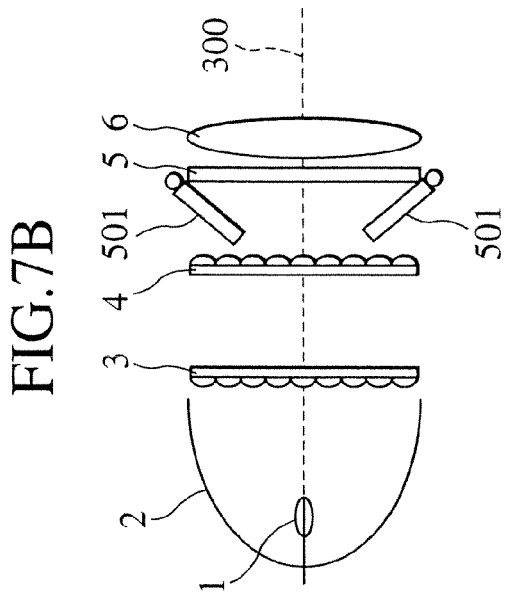
FIG. 7 is a diagram showing examples of arrangement of a light-masking unit.
Figure 7B:
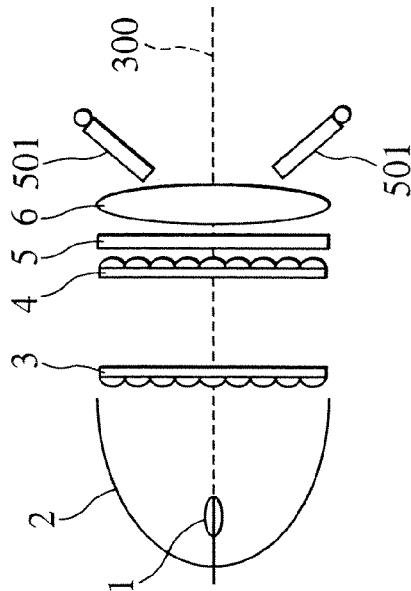
Figure 7C:
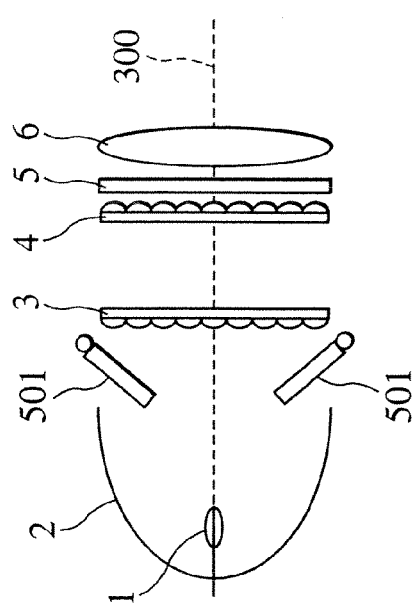
Figure 7D:
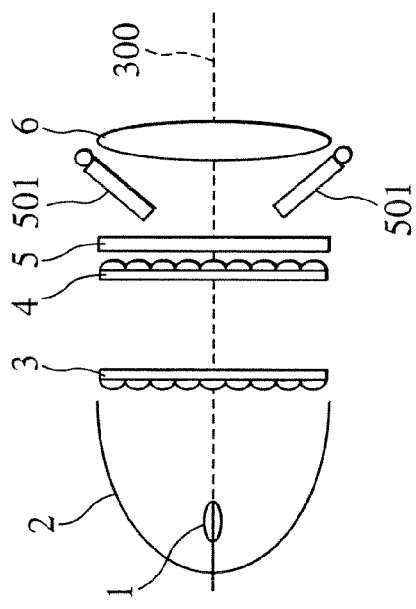

With an example in FIG. 6, the light-masking unit explained in FIG. 4 and FIG. 5 is used as a light-masking unit 501. Although the light-masking unit 501 in FIG. 6 is arranged between the first array lens 3 and the second array lens 4 to mask light beams by turning the light masks, they may be arranged between the light source 1 and the first array lens 3 as shown in FIG. 7A, between the second array lens 4 and the polarizing conversion element 5 as shown in FIG. 7B, on the light-exiting side of the polarizing conversion element 5 as shown in FIG. 7C, or on the light-exiting side of the superimposing lens 6 as shown in FIG. 7D. Therefore, when light-masking unit 501 is arranged between the first array lens 3 and the light source 1, light beams after light masking by these units pass through the first array lens 3. When light-masking unit 501 is arranged downstream of the first array lens 3 (as viewed from the light source 1), light beams exiting from the first array lens 3 are subject to light masking. In FIG. 7, optical elements after the superimposing lens 6 are omitted.

Figure 8B:
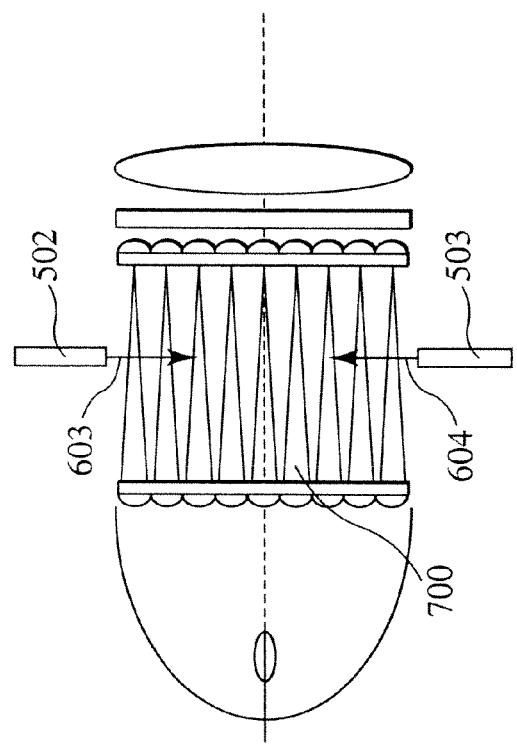
FIG. 8 is a diagram showing examples of a method of moving a light mask of the array lens.
Figure 8C:
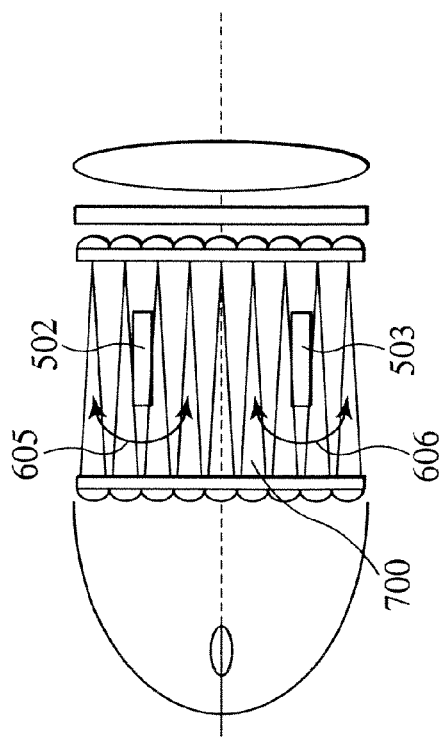
Figure 8A:
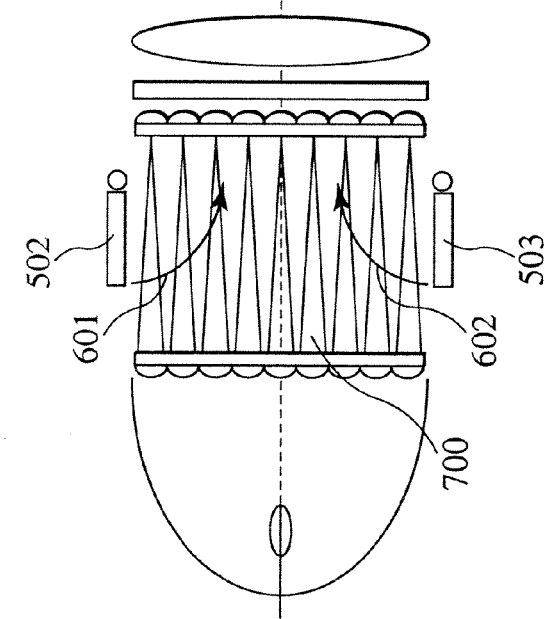

With a first embodiment, the light-masking unit is configured such that the light masks 502 and 503 are arranged outside the light beams, as shown in FIG. 8A, to maximize the amount of emitted light and that the units are turned in the directions indicated by arrows 601 and 602 to mask light beams 700 when adjusting the amount of light masking. However, the light-masking unit may be configured such that the light masks 502 and 503 are arranged outside the light beams, as shown in FIG. 8B, to maximize the amount of emitted light and that the units are moved in the direction indicated by arrows 603 and 604 to increase the amount of light masking.

Furthermore, the light-masking unit may be configured such that they are arranged in parallel with the optical axis in light beams, as shown in FIG. 8C, to maximize the amount of emitted light and that the units are turned in the direction indicated by arrows 605 and 606 to increase the amount of light masking.

A second embodiment is explained below. The second embodiment is a modified version of the first embodiment, wherein the light-masking method based on light masks has been changed. FIG. 9 shows, from the light source side, a condition that light masks 506 and 507 are projected on the first array lens 3. A hatched section 508 is a light-masking section formed by projecting the light mask 506; a hatched section 509 is a light-masking section formed by projecting the light mask 507.

FIG. 9A shows a condition that the amount of light emitted from the light source is maximized; FIG. 9B shows a condition that the amount of light emitted from the light source is minimized. When the amount of emitted light is adjusted as shown in FIG. 9B with this embodiment, the cells included in the sections 422, having the highest rate of contribution to the illumination intensity, are all light-masked. Then, sections 555 include cells without entire masking of light beams i.e., cells with partial transmission of light beams from the light source, having the highest rate of contribution to the illumination intensity. The amount of light masking can be increased while maintaining more uniform illumination distribution superimposed on the image display element by making the area of the light-masking section at cells included in the sections 555 smaller than the area of the light-masking section at other cells.

With the amount of light emitted from the light source adjusted to the minimized level with the embodiment in FIG. 9, the amount of light masking can be increased while maintaining more uniform illumination distribution superimposed on the image display element by making the area of the light-masking section at cells in the center section 421, having a low rate of contribution of the illumination intensity, larger than the area of the light-masking section at the cells included in the sections 555.

It is desirable that the area of the light-masking section at cells in the sections 555, among cells without entire masking of light beams, be not more than one half of the area of the cells as shown in FIG. 9B. The reason is explained above with reference to FIG. 1.

With the embodiments in FIG. 5 and FIG. 9, it is possible to maintain more uniform illumination distribution superimposed on the image display element while increasing the amount of light masking. Therefore, by making the amount of emitted light not more than 20% of the maximum amount of light emitted from the light source when adjusting the amount of light emitted from the light source from the maximum level to the minimum level, the uniformity level of the illumination distribution can be made practically problem-free even if all cells except 2 to about 16 cells, for example, are light-masked with the amount of light adjusted to the minimum level.

Since it is possible to maintain more uniform illumination distribution superimposed on the image display element while increasing the amount of light masking, even if all the array lens cells are partially or entirely light-masked, i.e., cells are at least partly light-masked, with the amount of light emitted from the light source adjusted to the minimum level as shown in the embodiments in FIG. 5 and FIG. 9B, the uniformity level of the illumination distribution can be made practically problem-free.

Figure 10B:
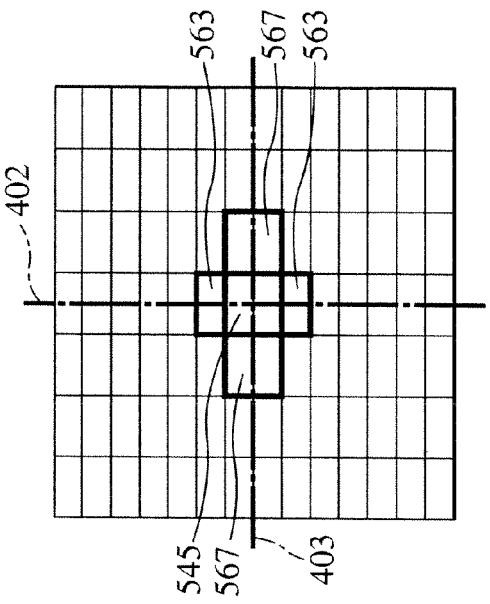
FIG. 10 is a diagram showing configurations of the array lens.
Figure 10C:
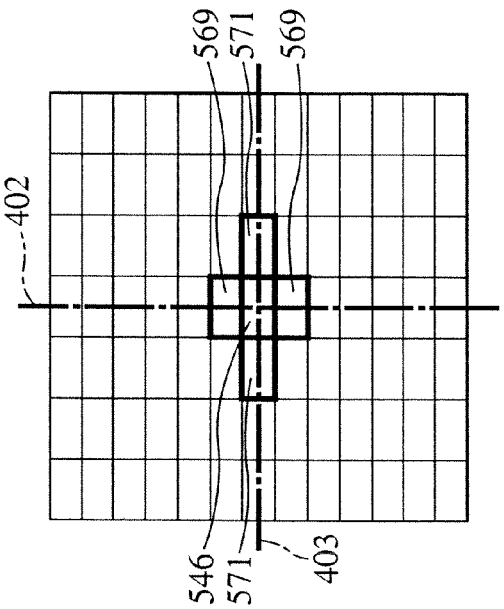
Figure 10A:
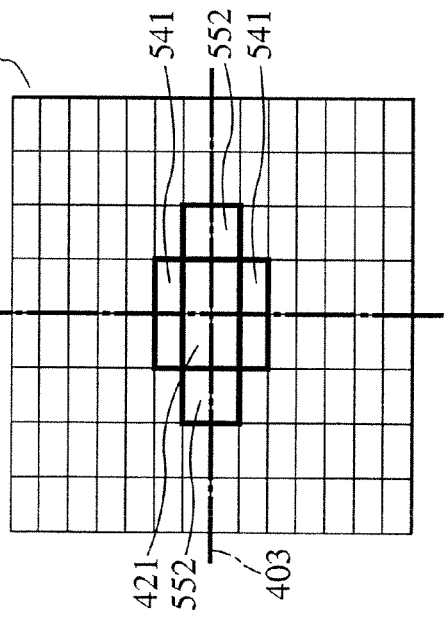

With these embodiments, furthermore, the first array lens 3 is configured such that rectangular cells are arranged, in line symmetry to the two axes which pass through and perpendicularly intersect the optical axis, in even-number columns. When rectangular cells are arranged in parallel with two arbitrary axes perpendicularly intersecting a general optical axis, there are three different arrangements of array lens cells as shown in FIG. 10A, FIG. 10B and FIG. 10C. FIG. 10A shows the array lens configuration used in the embodiments in FIG. 5 and FIG. 9. Cells included in the sections 422, having the highest rate of contribution to the illumination intensity explained in these embodiments, may be cell sections 552 shown in FIG. 10A. However, this configuration has the same meaning as the sections 422 because it can be made simply by rotating the sections 422 by 90 degrees centering around the optical axis.

With a third embodiment, the configuration of the first array lens 3 in FIG. 10A has been modified to the array lens configuration shown in FIG. 10B. Specifically, the array lens is configured such that rectangular cells are arranged, in line symmetry to the two axes which pass through and perpendicularly intersect the optical axis, in even-number columns in terms of one axis and odd-number columns in terms of the other axis. A cell section 421 including the center cells on the array lens in FIG. 10A corresponds to a cell section 545 on the array lens in FIG. 10B. Cell sections 552 on the array lens in FIG. 10A correspond to cell sections 563 or cell sections 567 on the array lens in FIG. 10B. Other cell sections are the same as those in the embodiments in FIG. 5 and FIG. 9. Even if arrangements of even-number columns and odd-number columns are reversed, the same configuration can be made simply by rotating the array lens arrangement shown in FIG. 10B by 90 degrees.

With a forth embodiment, the configuration of the first array lens 3 in FIG. 10A has been modified to the array lens configuration shown in FIG. 10C. Specifically, the array lens is configured such that rectangular cells are arranged, in line symmetry to the two axes which pass through and perpendicularly intersect the optical axis, in odd-number columns in terms of one axis and odd-number columns in terms of the other axis. A cell section 421 including the center cells on the first array lens 3 in FIG. 10A corresponds to the center cell 546 on the array lens in FIG. 10C. Cell sections 422 on the first array lens 3 in FIG. 10A correspond to cell sections 569 or cell sections 571 on the array lens in FIG. 10C.

In either example in FIG. 10, cells contacting the optical axis penetrating through the first array lens 3 (four cells in the section 421 in FIG. 10A, two cells in the section 545 in FIG. 10B, and one cell in the section 546 in FIG. 10C) and cells sharing a side are recognized as cells having the highest rate of contribution to the illumination intensity. The area of the light-transmitting section at these cells is made larger than the area of the light-transmitting section at other cells.

According to the above-mentioned embodiments, as mentioned above, a projection type image display apparatus using a light-masking unit based on light masks makes it possible to obtain images with a wide dynamic range while maintaining more uniform illumination distribution.

A calculating section (not shown) calculates the amount of light to be masked from an input image signal and then converts it into a signal for driving a driving apparatus (not shown) such as a motor. The amount of light masking is converted into the amount of movement and amount of turn of the light masks and then adjusted through driving by the above-mentioned driving apparatus.

What is claimed is:

1. A projection type image display apparatus, comprising;
   a light source which emits light;
   an optical system which includes a first array lens and a second array lens and a superimposing lens;
   a light valve which receives light passed through the optical system;
   a projection lens which projects the light from the light valve; and
   a light-masking unit to adjust a light masking amount by turning or moving a plurality of light masks which masks light beams between the first array lens and the second array lens,
   wherein:
   the first array lens has a plurality of lens cells arranged in a first direction and a second direction, including:
   1) at least one center lens cell contacting an optical axis of the light emitted from the light source,
   2) at least one first adjacent lens cell adjacent to the at least one center lens cell in the first direction away from the optical axis, and
   3) at least one second adjacent lens cell adjacent to the at least one center lens cell in the second direction away from the optical axis,
   in one light-masking condition, the light-masking unit masks light beams between the first array lens and the second array lens so that not less than 80% of the amount of light which is emitted from the light source and reaches the light valve is masked by the plurality of light masks; both a light beam through the at least one center lens cell and a light beam through the at least one first adjacent lens cell are partially light-masked; a light beam through the at least one second adjacent lens cell is entirely light-masked; and light masking ratio of the light beam through the at least one center lens cell is different from a light masking ratio of the light beam through the at least one first adjacent lens cell.

2. The projection type image display apparatus as defined in claim 1, wherein the light-masking unit turns or moves the plurality of light masks to adjust a light masking amount in the direction parallel to the second direction.

3. The projection type image display apparatus as defined in claim 1, wherein in the light-masking condition, a light-masking area for the at least one first adjacent lens cell is smaller than a light-masking area for the at least one center lens cell.

4. The projection type image display apparatus as defined in claim 1, wherein the amount of light masked by the light-masking unit increases when the plurality of the light masks are turned or moved close to each other by the light-masking unit.

5. A projection type image display apparatus, comprising:
   a light source which emits light;
   a first array lens and a second array lens which have a plurality of lens cells arranged in a first direction and a second direction;
   a light valve which receives light passed through the first array lens and second array lens;
   a projection lens which projects the light from the light valve; and
   a light-masking unit to adjust a light masking amount by turning or moving a plurality of light masks which masks light beams between the first array lens and the second array lens, wherein:
one of the two array lenses has:
1) at least one center lens cell which is the nearest lens cells to the center of the plurality of lens cells,
2) at least one first adjacent lens cell adjacent to the at least one center lens cell in the first direction away from the center of the plurality of lens cells, and
3) at least one second adjacent lens cell adjacent to the at least one center lens cell in the second direction away from the center of the plurality of lens cells,
in one light-masking condition, the light-masking unit masks light beams between the first array lens and the second array lens so that not less than 80% of the amount of light which is emitted from the light source and reaches the light valve is masked by the plurality of light masks; both a light beam through the at least one center lens cell and a light beam through the at least one first adjacent lens cell are partially light-masked; a light beam through the at least one second adjacent lens cell is entirely light-masked; and light masking ratio of the light beam through the at least one center lens cell is different from a light masking ratio of the light beam through the at least one first adjacent lens cell.

6. The projection type image display apparatus as defined in claim 5, wherein the light-masking unit changes a light masking area for the light beams in the direction parallel to the second direction by turning or moving the plurality of light masks.

7. The projection type image display apparatus as defined in claim 6, wherein in the light-masking condition, a light-masking area for the at least one first adjacent lens cell is smaller than a light-masking area for the at least one center lens cell.

8. The projection type image display apparatus as defined in claim 5, wherein the amount of light masked by the light-masking unit increases when the plurality of the light masks are turned or moved close to each other by the light-masking unit.

9. A projection type image display apparatus, comprising;
a light source which emits light;
an optical system which includes a first array lens and a second array lens and a superimposing lens;
a light valve which receives light passed through the optical system;
a projection lens which projects the light from the light valve; and
a light-masking unit to adjust a light masking amount by turning or moving a plurality of light masks which masks light beams between the first array lens and the second array lens,
wherein:
the first array lens has a plurality of lens cells arranged in a first direction and a second direction, including:
1) at least one center lens cell contacting an optical axis of the light emitted from the light source,
2) at least one first adjacent lens cell adjacent to the at least one center lens cell in the first direction away from the optical axis, and
3) at least one second adjacent lens cell adjacent to the at least one center lens cell in the second direction away from the optical axis,
in one light-masking condition, the light-masking unit masks light beams between the first array lens and the second array lens so that not less than 80% of the amount of light which is emitted from the light source and reaches the light valve is masked by the plurality of light masks; both a light beam through the at least one center lens cell and a light beam through the at least one first adjacent lens cell are partially light-masked; a light beam through the at least one second adjacent lens cell is entirely light-masked; and a shape of a light masking area for the light beam through the at least one center lens cell is different from a shape of a light masking area for the light beam through the at least one first adjacent lens cell.

10. The projection type image display apparatus as defined in claim 9, wherein the light-masking unit turns or moves the plurality of light masks to adjust a light masking amount in the direction parallel to the second direction.

11. The projection type image display apparatus as defined in claim 9, wherein in the light-masking condition, a light-masking area for the at least one first adjacent lens cell is smaller than a light-masking area for the at least one center lens cell.

12. The projection type image display apparatus as defined in claim 9, wherein the amount of light masked by the light-masking unit increases when the plurality of the light masks are turned or moved close to each other by the light-masking unit.

13. A projection type image display apparatus, comprising:
a light source which emits light;
a first array lens and a second array lens which have a plurality of lens cells arranged in a first direction and a second direction;
a light valve which receives light passed through the first array lens and second array lens;
a projection lens which projects the light from the light valve; and
a light-masking unit to adjust a light masking amount by turning or moving a plurality of light masks which masks light beams between the first array lens and the second array lens,
wherein:
one of the two array lenses has:
1) at least one center lens cell which is the nearest lens cells to the center of the plurality of lens cells,
2) at least one first adjacent lens cell adjacent to the at least one center lens cell in the first direction away from the center of the plurality of lens cells, and
3) at least one second adjacent lens cell adjacent to the at least one center lens cell in the second direction away from the center of the plurality of lens cells,
in one light-masking condition, the light-masking unit masks light beams between the first array lens and the second array lens so that not less than 80% of the amount of light which is emitted from the light source and reaches the light valve is masked by the plurality of light masks; both a light beam through the at least one center lens cell and a light beam through the at least one first adjacent lens cell are partially light-masked; a light beam through the at least one second adjacent lens cell is entirely light-masked; and a shape of a light masking area for the light beam through the at least one center lens cell is different from a shape of a light masking area for the light beam through the at least one first adjacent lens cell.

14. The projection type image display apparatus as defined in claim 13, wherein the light-masking unit changes a light masking area for the light beams in the direction parallel to the second direction by turning or moving the plurality of light masks.

15. The projection type image display apparatus as defined in claim 13, wherein in the light-masking condition, a light-masking area for the at least one first adjacent lens cell is smaller than a light-masking area for the at least one center lens cell.

16. The projection type image display apparatus as defined in claim 13, wherein the amount of light masked by the light-masking unit increases when the plurality of the light masks are turned or moved close to each other by the light-masking unit.

17. A projection type image display apparatus, comprising;
a light source which emits light; an optical system which includes a first array lens and a second array lens and a superimposing lens;
a light valve which receives light passed through the optical system;
a projection lens which projects the light from the light valve; and
a light-masking unit to adjust a light masking amount by turning or moving two light-masking plates which masks light beams between the first array lens and the second array lens,
wherein:
the first array lens has a plurality of lens cells arranged in a first direction and a second direction, including:
1) at least one center lens cell contacting an optical axis of the light emitted from the light source,
2) at least one first adjacent lens cell adjacent to the at least one center lens cell in the first direction away from the optical axis, and
3) at least one second adjacent lens cell adjacent to the at least one center lens cell in the second direction away from the optical axis,
in one light-masking condition, the light-masking unit masks light beams between the first array lens and the second array lens so that not less than 80% of the amount of light which is emitted from the light source and reaches the light valve is masked by only the two light-masking plates; both a light beam through the at least one center lens cell and a light beam through the at least one first adjacent lens cell are partially light-masked; a light beam through the at least one second adjacent lens cell is entirely light-masked; and light masking ratio of the light beam through the at least one center lens cell is different from a light masking ratio of the light beam through the at least one first adjacent lens cell.

18. The projection type image display apparatus as defined in claim 17, wherein the light-masking unit turns or moves the two light-masking plates to adjust a light masking amount in the direction parallel to the second direction.

19. The projection type image display apparatus as defined in claim 17, wherein in the light-masking condition, a light-masking area for the at least one first adjacent lens cell is smaller than a light-masking area for the at least one center lens cell.

20. The projection type image display apparatus as defined in claim 17, wherein the amount of light masked by the light-masking unit increases when the two light-masking plates are turned or moved close to each other by the light-masking unit.

21. A projection type image display apparatus, comprising:
a light source which emits light;
a first array lens and a second array lens which have a plurality of lens cells arranged in a first direction and a second direction;
a light valve which receives light passed through the first array lens and second array lens;
a projection lens which projects the light from the light valve; and
a light-masking unit to adjust a light masking amount by turning or moving two light-masking plates which masks light beams between the first array lens and the second array lens,
wherein:
one of the two array lenses has:
1) at least one center lens cell which is the nearest lens cells to the center of the plurality of lens cells,
2) at least one first adjacent lens cell adjacent to the at least one center lens cell in the first direction away from the center of the plurality of lens cells, and
3) at least one second adjacent lens cell adjacent to the at least one center lens cell in the second direction away from the center of the plurality of lens cells,
in one light-masking condition, the light-masking unit masks light beams between the first array lens and the second array lens so that not less than 80% of the amount of light which is emitted from the light source and reaches the light valve is masked by only the two light-masking plates; both a light beam through the at least one center lens cell and a light beam through the at least one first adjacent lens cell are partially light-masked; a light beam through the at least one second adjacent lens cell is entirely light-masked; and light masking ratio of the light beam through the at least one center lens cell is different from a light masking ratio of the light beam through the at least one first adjacent lens cell.

22. The projection type image display apparatus as defined in claim 21, wherein the light-masking unit changes a light masking area for the light beams in the direction parallel to the second direction by turning or moving the two light-masking plates.

23. The projection type image display apparatus as defined in claim 21, wherein in the light-masking condition, a light-masking area for the at least one first adjacent lens cell is smaller than a light-masking area for the at least one center lens cell.

24. The projection type image display apparatus as defined in claim 21, wherein the amount of light masked by the light-masking unit increases when the two light-masking plates are turned or moved close to each other by the light-masking unit.

25. A projection type image display apparatus, comprising;
a light source which emits light;
an optical system which includes a first array lens and a second array lens and a superimposing lens;
a light valve which receives light passed through the optical system; a projection lens which projects the light from the light valve; and
a light-masking unit to adjust a light masking amount by turning or moving two light-masking plates which masks light beams between the first array lens and the second array lens,
wherein:
the first array lens has a plurality of lens cells arranged in a first direction and a second direction, including:
1) at least one center lens cell contacting an optical axis of the light emitted from the light source, 2) at least one first adjacent lens cell adjacent to the at least one center lens cell in the first direction away from the optical axis, and
3) at least one second adjacent lens cell adjacent to the at least one center lens cell in the second direction away from the optical axis,
in one light-masking condition, the light-masking unit masks light beams between the first array lens and the second array lens so that not less than 80% of the amount of light which is emitted from the light source and reaches the light valve is masked by only the two light-masking plates; both a light beam through the at least one center lens cell and a light beam through the at least one first adjacent lens cell are partially light-masked; a light beam through the at least one second adjacent lens cell is entirely light-masked; and a shape of a light masking area for the light beam through the at least one center lens cell is different from a shape of a light masking area for the light beam through the at least one first adjacent lens cell.

26. The projection type image display apparatus as defined in claim 25, wherein the light-masking unit turns or moves the two light-masking plates to adjust a light masking amount in the direction parallel to the second direction.

27. The projection type image display apparatus as defined in claim 25, wherein in the light-masking condition, a light-masking area for the at least one first adjacent lens cell is smaller than a light-masking area for the at least one center lens cell.

28. The projection type image display apparatus as defined in claim 25, wherein the amount of light masked by the light-masking unit increases when the two light-masking plates are turned or moved close to each other by the light-masking unit.

29. A projection type image display apparatus, comprising:
a light source which emits light;
a first array lens and a second array lens which have a plurality of lens cells arranged in a first direction and a second direction;
a light valve which receives light passed through the first array lens and second array lens;
a projection lens which projects the light from the light valve; and
a light-masking unit to adjust a light masking amount by turning or moving two light-masking plates which masks light beams between the first array lens and the second array lens,
wherein:
one of the two array lenses has:

1) at least one center lens cell which is the nearest lens cells to the center of the plurality of lens cells,
2) at least one first adjacent lens cell adjacent to the at least one center lens cell in the first direction away from the center of the plurality of lens cells, and
3) at least one second adjacent lens cell adjacent to the at least one center lens cell in the second direction away from the center of the plurality of lens cells,
in one light-masking condition, the light-masking unit masks light beams between the first array lens and the second array lens so that not less than 80% of the amount of light which is emitted from the light source and reaches the light valve is masked by only the two light-masking plates; both a light beam through the at least one center lens cell and a light beam through the at least one first adjacent lens cell are partially light-masked; a light beam through the at least one second adjacent lens cell is entirely light-masked; and a shape of a light masking area for the light beam through the at least one center lens cell is different from a shape of a light masking area for the light beam through the at least one first adjacent lens cell.

30. The projection type image display apparatus as defined in claim 29, wherein the light-masking unit changes a light masking area for the light beams in the direction parallel to the second direction by turning or moving the two light-masking plates.

31. The projection type image display apparatus as defined in claim 29, wherein in the light-masking condition, a light-masking area for the at least one first adjacent lens cell is smaller than a light-masking area for the at least one center lens cell.

32. The projection type image display apparatus as defined in claim 29, wherein the amount of light masked by the light-masking unit increases when the two light-masking plates are turned or moved close to each other by the light-masking unit.

* * * * *